(12) United States Patent
Eder et al.

(10) Patent No.: US 8,603,273 B2
(45) Date of Patent: Dec. 10, 2013

(54) METHOD OF PRODUCING A FRICTION LINING

(75) Inventors: Manuel Eder, Timelkam (AT); Gerhard Hartner, Bad Wimsbach (AT)

(73) Assignee: Miba Frictec GmbH (AT)

( * ) Notice: Subject to any disclaimer, the term of this patent is extended or adjusted under 35 U.S.C. 154(b) by 1209 days.

(21) Appl. No.: 12/249,065

(22) Filed: Oct. 10, 2008

(65) Prior Publication Data

US 2009/0239772 A1    Sep. 24, 2009

(30) Foreign Application Priority Data

Oct. 10, 2007  (AT) .................... A 1609/2007

(51) Int. Cl.
*B32B 5/02* (2006.01)
*F16D 69/02* (2006.01)

(52) U.S. Cl.
USPC ........................ 156/62.2; 156/327

(58) Field of Classification Search
USPC ............................... 156/62.2, 327
See application file for complete search history.

(56) References Cited

U.S. PATENT DOCUMENTS

| | | | |
|---|---|---|---|
| 1,671,914 A * | 5/1928 | Wescott | 427/350 |
| 1,838,826 A * | 12/1931 | Gunther et al. | 524/160 |
| 2,173,244 A * | 9/1939 | Young | 427/430.1 |
| 2,463,225 A | 3/1949 | Vincent | |
| 3,019,192 A | 1/1962 | Heinz et al. | |
| 4,118,528 A | 10/1978 | Lowry | |
| 4,256,801 A | 3/1981 | Chuluda | |
| 4,780,141 A | 10/1988 | Double et al. | |
| 4,923,920 A | 5/1990 | Scholl et al. | |
| 5,472,995 A | 12/1995 | Kaminski et al. | |
| 6,524,681 B1 | 2/2003 | Seitz et al. | |
| 7,134,466 B2 | 11/2006 | Obrecht et al. | |
| 2003/0089888 A1 | 5/2003 | Bacher et al. | |
| 2005/0266758 A1 | 12/2005 | Nishikori et al. | |

FOREIGN PATENT DOCUMENTS

| | | |
|---|---|---|
| DE | 1111397 | 7/1961 |
| DE | 2041987 A1 | 3/1972 |
| DE | 3046963 A1 | 9/1981 |
| DE | 3721766 | 1/1989 |
| DE | 19505354 A1 | 8/1996 |
| DE | 103 07 139 | 9/2004 |
| EP | 0892896 A1 | 1/1999 |
| EP | 1300514 | 4/2003 |
| GB | 905054 A | 9/1962 |
| GB | 1102246 A | 2/1968 |
| GB | 1335755 A | 10/1973 |

(Continued)

OTHER PUBLICATIONS

Abstract and Machine Translation of JP 2000-213578. Date Unknown.*

(Continued)

*Primary Examiner* — Michael Tolin
(74) *Attorney, Agent, or Firm* — Lerner, David, Littenberg, Krumholz & Mentlik, LLP

(57) ABSTRACT

The invention relates to a method of producing a friction lining whereby a friction paper is displaced with a latex based on an elastomer and fibers of the friction paper are then bonded one another due to precipitation of the elastomer out of the latex. A non-surface active protective colloid is added to the latex as a suspension agent before applying it to the friction paper.

5 Claims, 1 Drawing Sheet

(56) References Cited

FOREIGN PATENT DOCUMENTS

| JP | 60-139933 | | 7/1985 |
|----|-----------|---|--------|
| JP | 06-234866 | A * | 8/1994 |
| JP | 2000-213578 | | 8/2000 |
| WO | 0188055 | A1 | 11/2001 |

OTHER PUBLICATIONS

Full translation of JP 60-139933 A to Hideo Suzuki et al. Date unknown.*

Article entitled Elastizitatsmodul in Zahlen, URL www.techfak.uni-kiel.de/matwis/amat/mw1_ge/kap_7/illustr/t7_1_2.html, dated Oct. 4, 2008.

Office Action to priority Austrian Application No. A1609/2007, dated Apr. 9, 2008.

METOLAT P 530 [Technische Information—online: Aug. 28, 2006 ). URL. ://www.acat.com/_files/datasheets/390/METOLA T p_530(TMBDE). pdf [Download: Feb. 9, 2009).

Austrian Search Report for Application No. A 1609/2007 dated Feb. 10, 2009.

European Search Report for Application No. EP2048406A3 dated Apr. 29, 2009.

* cited by examiner

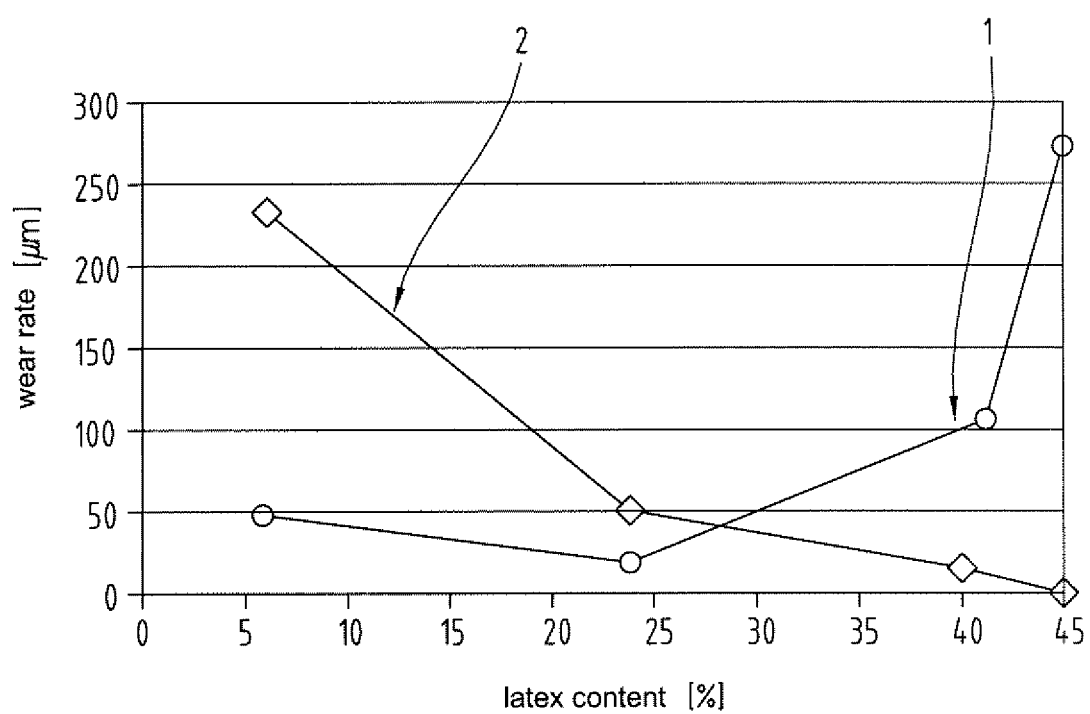

METHOD OF PRODUCING A FRICTION LINING

CROSS REFERENCE TO RELATED APPLICATION

In accordance with 35 U.S.C. §119, the applicants claim the priority of Austrian patent application No. A 1609/2007 of 10 Oct. 2007.

BACKGROUND OF THE INVENTION

The invention relates to a method of producing a friction lining, whereby a friction paper is displaced with a latex based on an elastomer and fibers of the friction paper are then bonded to one another due to precipitation of the elastomer out of the latex, a friction lining, in particular a friction lining for wet operation, comprising at least one friction paper with fibers which are bonded to at least one elastomer, as well as a friction unit, in particular a motorcycle clutch, comprising a friction lining on a support and a counter plate which co-operates with the friction lining.

For specific use in the friction metals industry, such as motorcycle clutches or in applications using counter plates made from light metal or light metal alloys which are susceptible to wear, it is standard practice to use friction linings with a higher degree of elasticity than the friction linings used for other applications. The reason for this resides in the wear-sensitive counter plate because it is made from light metal or light metal alloys associated with a corresponding reduction in weight as required by the automotive industry. By reducing the weight of the clutch directly, it is possible to achieve an increase in power, especially in the case of smaller engines.

These days, latexes in powdered format are predominantly used to produce such friction paper with a higher elasticity. However, the problem with this is that they are disposed loosely between the fibers of the friction paper as spacers and an adequate bonding is not produced between the individual elements.

Problems also occur when it comes to producing friction linings with high latex contents economically, for example on a paper machine, because when using higher quantities of latex, it can no longer be kept stable and a specifically controlled precipitation of the latex on the fiber surface or in the fiber matrix no longer takes place. In the event of uncontrolled precipitation of the latex, it no longer interacts with the components of the friction paper but tends by preference towards the surfaces of the paper machine. In other words, after only a short production time, large quantities of latex deposits are left on vat walls, stirrers and in pipes. These problems occur with effect from a latex content above 20%. Production becomes impossible due to filling and clogging pipes. The paper machine clogs regularly and becomes uncontrollable. Occasionally, these latex deposits then detach and precipitate in the paper causing faulty areas and irregularities.

So far, attempts to solve this problem by using dispersing agents have failed because it has not been possible to improve the tendency of the latex to deposit or has not been so to a sufficient degree. Since these dispersing agents have a base of surface active agent and are therefore active at the boundary surface, they reduce the surface tension of aqueous solutions, thereby creating an additional and not inconsiderable foam problem.

Friction linings bonded with and containing latex are already described in the prior art. For example, JP 2000-213578 A describes a clutch for wet operation, comprising an annular core element made from a steel plate or an aluminum alloy, which is lined with a friction material on both sides. This wet friction material is produced by impregnating a paper base material with a heat-curable resin. The paper base material is made from normal paper with fibers of an organic or inorganic nature, a filler and latex. The latex content in the paper base material in this instance is in the range of between 0.4% by weight and 25% by weight.

JP 60-139933 A describes a friction element for brakes or clutches of an automotive vehicle or a motorcycle. The friction element is made from paper which contains between 1 and 30% by weight of rubber latex. An NBR or SBR latex is used by preference. This imparts a corresponding elasticity to the friction element and the coefficient of friction of thin paper can be improved. This also reduces resistance to abrasion.

BRIEF SUMMARY OF THE INVENTION

The objective of this invention is to produce a friction element and friction material which has a high elasticity so that it can also be used for wear-susceptible counter plates made from light metals or their alloys.

This objective is achieved by the invention, independently in each case, firstly by means of a method of the type outlined above, whereby a non-surface active protective colloid is added to the latex as a suspension agent before applying it to the friction paper, by means of the friction lining in which the elastomer forms a two- or three-dimensional network, and by means of the friction unit, which incorporates the friction lining proposed by the invention. The advantage of this is that using a non-surface active protective colloid as a suspension agent makes it possible to use and apply higher latex contents to friction paper, as a result of which the latex generates a stable bond with the surface of the fibrous components of the friction paper on the one hand and an elastic bond between the individual fibers of the friction paper on the other hand. Since it is possible to use a higher proportion of latex in or on the friction paper, a two-dimensional or three-dimensional network is created which, on the one hand, permits a high porosity to enable the oil incorporated in the friction lining to be dispensed more easily and also possesses good wear properties even in the event of poor oiling. On the other hand, a corresponding elasticity of the friction lining is obtained because not only does the latex lie loosely between the individual fibers of the friction paper, the individual fibers bond with one another which assists and improves dispensing of the oil from the friction lining accordingly. By stabilizing the latex in this way, it is possible to apply it directly to the surface of the individual phases and only then is the dispersion or emulsion broken down by shifting the pH value, thereby initiating or causing the elastomer to precipitate out of the latex. Due to the higher latex content and elastomer content in the friction lining and the associated higher elasticity of the friction lining, the tendency of these units to fail due to wear can be reduced or prevented, as a result of which these friction linings can be used, in particular these clutches and wear-susceptible friction units made from light metals or light metal alloys.

In particular, the protective colloid is an anionically acting naphthalene sulfonic acid condensation product because it enables a correspondingly good stabilization of aqueous latex dispersions and emulsions to be achieved. In particular, in another embodiment of the invention, the naphthalene sulfonic acid condensation products used are condensation products from naphthalene sulfonic acid produced with at least one compound selected from a group comprising formaldehyde and alkanes, in particular C1 to C4. These condensation products have proved to be particularly suitable during tests conducted within the scope of the invention. In particular, sodium salts of naphthalene sulfonic acid/formaldehyde condensates may be used.

Such naphthalene sulfonic acid condensation products may be obtained from the ACAT company (Applied Chemicals Advanced Technologies) for example.

The naphthalene sulfonic acid condensation product is preferably added to the latex in a concentration selected from a range with a lower limit of 0.1% and an upper limit of 10%, by reference to the latex. Below 0.1% adequate stabilization of the latex was no longer observed, especially if this latex contained a higher proportion of elastomer. Above 10%, the reaction kinetics were found to be detrimentally affected during subsequent precipitation of the elastomer from the latex. This is associated with a longer production time and irregularities in the friction lining itself. In particular, it was found that with too high a proportion of protective colloid, the porosity of the friction lining exhibited significant irregularities, thereby resulting in areas with too low a porosity.

In particular, the naphthalene sulfonic acid condensation product is added to the latex in a concentration selected from a range with a lower limit of 1% and an upper limit of 8%, preferably from a range with a lower limit of 3% and an upper limit of 6%, by reference to the latex.

The latex preferably has an elastomer content of 40% by weight to 70% by weight, which means that for higher elastomer contents in the friction lining lower quantities of latex have to be applied and the precipitation of the elastomer from the latex is made easier, as well as shortening the production time.

The latex content may also be selected from a range with a lower limit of 45% by weight and an upper limit of 65% by weight, or selected from a range with a lower limit of 50% by weight and an upper limit of 55% by weight.

The friction paper may be displaced with a proportion of latex selected from a range with a lower limit of 15%, in particular 30%, and an upper limit of 40%, by reference to the friction paper with the latex. Below 15%, the friction lining no longer exhibits the desired elasticity. Above 40%, a further increase in the proportion of latex or elastomer causes an increase in the wear of the friction material so that it fails prematurely.

The friction lining is preferably produced on a paper machine, thereby enabling a higher degree of automation and a correspondingly straightforward production process.

The elastomer may be selected from a group comprising SBR (styrene-butadiene rubber), NBR (nitrile butadiene rubber), IR (isoprene rubber), NR (natural rubber), ABS-rubber (acrylonitrile-butadiene-styrene) and all blends thereof. With these elastomers, a very good resistance to wear of the friction lining was achieved and at the same time a high elasticity.

The porosity of the friction lining on the plate may be selected from a range with a lower limit of 35% and an upper limit of 55% of the solid density, i.e. the density of the solid material, thereby improving the wet operation capability of the friction lining, in particular the capacity of this friction lining to store oil, and further improving the dispensing of oil.

The porosity may also be selected from a range with a lower limit of 40% and an upper limit of 50%.

By preference, the friction lining has a modulus of elasticity selected from a range with a lower limit of 80 N/mm$^2$ and an upper limit of 160 N/mm$^2$, which is even more gentle on counter plates made from light metals or light metal alloys in terms of their wear on the one hand and, on the other hand, imparts a sufficiently high wear resistance to the friction lining itself.

The modulus of elasticity of the friction lining may also be selected from a range with a lower limit of 90 N/mm$^2$ and an upper limit of 140 N/mm$^2$.

The counter plate of the friction unit specifically has a Brinell hardness (test load 32.25 kg, ball diameter 2.5 mm, steel ball) selected from a range with a lower limit of HB 60 and an upper limit of HB 95, which permits a corresponding reduction in the weight of this friction unit as well as enabling better adjustment of the friction lining on the one hand and the counter plate on the other hand with respect to wear.

BRIEF DESCRIPTION OF THE DRAWINGS

To provide a clearer understanding of the invention, it will be explained in more detail below on the basis of examples and the appended drawing.

The drawing is a schematically simplified drawing illustrating the following:

FIG. 1 wear rate as a function of the latex content of a friction lining proposed by the invention.

DETAILED DESCRIPTION

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

By way of introduction, it should also be pointed out that within the context of the invention, the term latex should be construed as meaning by definition a colloidal dispersion or emulsion of an elastomer in an aqueous medium.

The paper used for such friction linings is a standard paper, for example a paper with a grammage of 290 g/m$^2$. This paper is produced in the standard manner on a paper machine and a latex based on an elastomer is applied to the paper during the production process by means of a coating unit. The proportion of latex in the paper lies within the range specified above. It is also possible to add the latex to the fiber pulp used to produce the paper.

If necessary, other auxiliary agents may be added to the latex or to the overall mixture, such as for example solidifiers, such as polyamide resins or polyamidoamine-epichlorohydrin resins and fillers or friction particles, e.g. SiO$_2$. The latex preferably has a viscosity of between 9 and 25 cps. As a result, the latex is able to penetrate the fiber matrix of the paper so that there is not just a superficial coating of latex on the paper. Once the latex has been applied to the paper, the elastomer is made to precipitate by reducing the pH value to a range of between 4.0 and 5.0. This is done by adding acids, for example.

Instead of using a paper machine, the friction lining may also be produced manually for example, in which case the latex is manually applied to the paper.

If necessary, it is also possible to apply the latex by a spraying process instead of applying a coating to the paper.

Within the scope of the invention, the following embodiments were prepared as examples.

A paper with a grammage of 300 g/m² was used. A latex based on the following composition was then applied to this paper.

Elastomer content: 50% by weight
Naphthalene sulfonic acid formaldehyde condensate: 0.3% by weight to 0.5% by weight (by reference to the total mixture)
Rest: water This latex was added to the paper fiber pulp and the paper was produced with a standard paper machine.

After applying the latex, the pH value was reduced to 4.5 with an acid, preferably $Al_2(SO_4)_3$, to cause the elastomer molecules and elastomer to precipitate. As a result, a three-dimensional, spider's web-type network was created, by means of which the individual fibers of the fiber matrix of the paper were "glued" to one another. This friction lining had a porosity of 80% (not on the plate).

The elastomer used was an ABS elastomer available from Emerald Inc.

The friction lining produced in this manner was then adhered to a metal support. The metal used was an aluminum-magnesium alloy (AlZn5,5 MgCu).

Naturally, it would also be possible to use other metal supports, for example other aluminum alloys or aluminum as such or alternatively steel, etc.

A motorcycle clutch was fitted with the friction element produced in this manner and the counter plate used was also made from an aluminum-magnesium alloy (AlZn5,5MgCu) with a Brinell hardness HB=85.

The wear behavior of this friction unit was then determined by ascertaining the wear rate by measuring the difference in thickness subsequent to the respective wearing. The wear rate of both the friction lining itself, i.e. the friction lining plate, and the aluminum counter plate was determined and the result is set out in FIG. 1. The wear rate in μm is plotted on the ordinate and the latex content as a % is plotted on the abscissa.

Curve 1 in FIG. 1 plots the wear rate of the friction lining plate and curve 2 that of the aluminum counter plate.

In preparing FIG. 1, different latex contents, i.e. friction linings made from paper with different proportions of latex, were tested for their wear behavior. As may be seen from the graph, latex proportions of 5%, 24% and 40% were tested.

The graph clearly demonstrates that the wear rate of the aluminum counter plate drops, the higher the proportion of latex in the friction lining is, whereas conversely, the wear rate of the friction lining plate increases significantly as the latex content in the friction paper is increased. An optimum value for this friction unit in terms of wear behavior was specifically observed in the range of between 20 and 30% of latex or elastomer in the friction lining, whereas in terms of more gentle operation of the counter plate made from aluminum, proportions of elastomer of up to 40%, in particular between 30 and 40%, may be used in the friction lining and it is clearly evident that with a latex content above 40%, for example at 45%, the wear rate of the friction lining plate rises disproportionately and contents of latex or elastomer in excess of 40% are no longer practicable because the friction lining plate wears too quickly.

These tests were also repeated using other latexes, namely SBR, IR and NR, and resulted in essentially the same curves and it was found that with regard to the friction unit as a whole, an elastomer proportion of between 30 and 40% in the friction paper is optimum.

The embodiments illustrated as examples represent possible variants of the friction lining and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

The invention claimed is:

1. A method of producing a friction lining comprising:
   applying a latex based on an elastomer to a friction paper, the latex having an elastomer content of 40%-70% by weight;
   precipitating the elastomer by reducing the pH value to between 4.0-5.0;
   bonding fibers of the friction paper to one another to form a three-dimensional, spider's web-type network due to precipitation of the elastomer out of the latex;
   adding a non-surface active protective colloid to the latex as a suspension agent before applying it to the friction paper,
   wherein the friction paper includes a proportion of elastomer selected from a range of 30%-40% by weight, based on the total weight of the friction paper and the elastomer.

2. The method according to claim 1, wherein an anionically acting naphthalene sulfonic acid condensation product is used as the protective colloid.

3. The method according to claim 2, wherein a condensation product of naphthalene sulfonic acid with at least one compound selected from the group consisting of formaldehyde and alkanes is used as the naphthalene sulfonic acid condensation product.

4. The method according to claim 2, wherein the naphthalene sulfonic acid condensation product is added to the latex in a concentration selected from a range with a lower limit of 0.1% and an upper limit of 10%, by reference to the latex.

5. The method according to claim 1, wherein the applying, bonding, and adding steps are performed on a paper machine.

* * * * *